United States Patent [19]

Granzow

[11] 4,278,591
[45] Jul. 14, 1981

[54] FLAME RETARDANT POLY(BUTYLENE TEREPHTHALATE) COMPOSITION

[75] Inventor: Albrecht H. Granzow, Somerset, N.J.

[73] Assignee: American Cyanamid Company, Stamford, Conn.

[21] Appl. No.: 105,686

[22] Filed: Dec. 20, 1979

[51] Int. Cl.³ .......................... C08K 5/34; C08K 5/52; C08K 5/53
[52] U.S. Cl. .......................... 260/45.75 D; 260/40 R; 260/45.7 P; 260/45.7 R; 260/45.75 B; 260/45.75 F; 260/45.75 V; 260/45.75 W; 260/45.8 NE; 260/45.8 R; 525/437
[58] Field of Search .................. 260/45.8 NE, 45.8 R, 260/45.7 R, 45.75 B, 45.75 W, 45.75 F, 45.75 D, 45.75 V; 525/437

[56] References Cited

U.S. PATENT DOCUMENTS

| | | | |
|---|---|---|---|
| 3,914,193 | 10/1975 | Fessler et al. | 260/17 R |
| 3,970,635 | 7/1976 | Lawton et al. | 260/45.8 R |
| 3,987,008 | 10/1976 | Stackman | 525/437 |
| 4,070,336 | 1/1978 | Birum | 260/45.8 R |
| 4,094,926 | 6/1978 | Sheard et al. | 525/437 |
| 4,178,281 | 12/1979 | Horn, Jr. | 260/45.8 R |
| 4,201,705 | 5/1980 | Halpern et al. | 260/45.8 NT |

Primary Examiner—Howard E. Schain
Assistant Examiner—R. A. White
Attorney, Agent, or Firm—Bruce F. Jacobs

[57] ABSTRACT

Flame retardant poly(butylene terephthalate) compositions are prepared by incorporating into the polymer a combination of a polymeric pentaerythrityl phosphonate and melamine pyrophosphate.

5 Claims, No Drawings

FLAME RETARDANT POLY(BUTYLENE TEREPHTHALATE) COMPOSITION

This invention relates to the use of polymeric pentaerythrityl phosphonates in combination with melamine pyrophosphate to flame retard poly(1,4-butylene terephthalate) polymers, and the compositions produced thereby.

The polymeric pentaerythrityl phosphonates used herein are disclosed and claimed in commonly assigned U.S. Ser. No. 900,828, now U.S. Pat. No. 4,217,267. They are stated to be useful alone, and in combination with ammonium polyphosphate to flame retard polyolefins such as polypropylene. However such a combination has not been found useful in poly(1,4-butylene terephthalate) polymers apparently due to the higher processing temperatures used with these polymers causing decomposition of the ammonium polyphosphate.

In accordance with the present invention flame retardant compositions are prepared comprising a poly(1,4-butylene terephthalate) polymer and a flame retardingly effective amount of a combination of a polymeric pentaerythrityl phosphonate of the formula

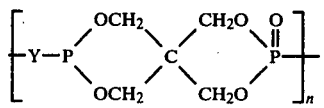

wherein Y is selected from

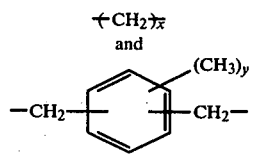

wherein n is at least 2; x is an integer from 1 to 8; and y is 0 to 4; and melamine pyrophosphate.

Preferred polymeric phosphonates are those wherein Y is selected from

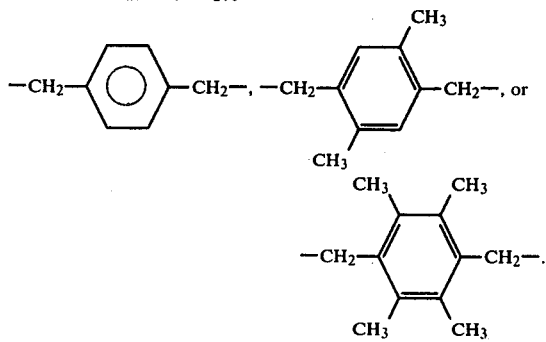

In the particularly preferred embodiment, Y is

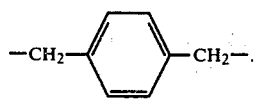

Generally the polymeric phosphonate and the melamine pyrophosphate are used in a weight ratio of from about 1:5 to about 5:1 though this ratio has not been found to be critical.

Optionally, to further improve the flame retardant compositions of the present invention, various oxides and/or carbonates may be added. Generally they are added to the polymer in amounts ranging from about 0.25 to 5 percent by weight, based on the weight of the polymer. Useful compounds include alkali metal carbonates, such as sodium carbonate, potassium carbonate, etc.; alkaline earth metal oxides such as barium oxide, magnesium oxide, etc.; alkaline earth metal carbonates, such as magnesium carbonate, calcium carbonate, etc.; Group IV-A metal oxides, such as silicon dioxide, stanic oxide, etc.; titanium dioxide, zinc oxide, aluminum oxide, antimony oxide, and the like.

In general, the polymeric pentaerythrityl phosphonates of this invention may be prepared by reacting a dialkyl pentaerythrityl diphosphite, wherein the alkyl group has about 1-8 carbon atoms, e.g., diethyl pentaerythrityl diphosphite, with the appropriate alpha,omega-dihalide (bromide, chloride) under nitrogen at a temperature of about 80°-200° C. for about 1 to 20 hours. The molar ratio of phosphite to dihalide should be about 1.0-1.1/1. The reaction is readily conducted in the absence of a solvent; however a solvent such as methylene chloride or o-dichlorobenzene may be used. Further details of the preparation are in U.S. Ser. No. 900,828, now U.S. Pat. No. 4,217,267 issued Aug. 12, 1980, incorporated herein by reference.

By poly(butylene terephthalate) polymers herein is meant the known homopolymers thereof as well as the copolymers thereof with conventional monomers.

The polymeric pentaerythrityl phosphonate and melamine pyrophosphate combination is useful as a flame retardant in poly(1,4-butylene terephthalate) in effective amounts, i.e., from about 10 to about 50 percent by weight based on the weight of the composition. The amount of the polymeric pentaerythrityl phosphonate used should be at least about 5% by weight of the total composition to provide self-extinguishing, non-dripping compositions.

The flame retardant polyphosphonate and melamine pyrophosphate, in combinations as described, may be added to the polymer as such, or as individual components, by any known method, such as by milling the polymer and the components on, for example, a two-roll mill, in a Banbury mixer, etc., by molding the components and the polymer simultaneously, or by extruding the polymer and components, or by merely blending all the ingredients together in powder form and thereafter forming the desired ultimate product. Additionally, the flame retardant components or combination may be added during the production of the polymer, i.e., during polymerization, provided the catalyst, conditions, and other ingredients of the polymerization are inert thereto.

It is also within the scope of the invention to incorporate such ingredients as plasticizers, dyes, pigments, heat and light stabilizers, antioxidants, antistatic agents, photochromic materials, and the like, into the polymer composition.

In the following examples, which are presented merely for the purpose of illustrating the present invention, all parts and percents are by weight unless otherwise specified.

EXAMPLE 1

Following the procedures set forth in U.S. Ser. No. 900,828, a polymeric pentaerythrityl phosphonate of Formula I was prepared wherein Y was

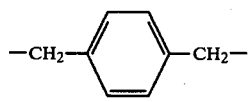

EXAMPLE 2

A dry blend (10 grams) of poly(1,4-butylene terephthalate) containing the flame retardant additive, or mixture of additives, under test was extruded through a Melt Index Apparatus (described in ASTM D-1238) at 250° C. to give a cylindrical extrudate 3–5 inches in length and 0.125 inch in diameter. The extrudate was subjected to the following flammability test procedures.

A. Vertical Flammability Rating (described in Underwriters Laboratories Test UL-94, Vertical Test Method 3.10–3.15, September, 1973).

Each sample, clamped in a vertical position, is ignited with a ¾ inch blue flame for 10 seconds. The test flame is withdrawn and the duration of the flaming before extinguishment is recorded. If flaming ceases within 25 seconds, the test flame is again applied for 10 seconds, and the flame is withdrawn. If the flame extinguishment time does not exceed 5 seconds for either flame application and the sample does not drip flaming droplets, it is rated V-0. If the flame extinguishment time for either flame application is between 5 and 25 seconds and the sample does not drip flaming droplets, it is rated V-1. If the flame extinguishment time for either flame application is less than 25 seconds and the sample drips flaming droplets, it is rated V-2. If the flame extinguishment time is greater than 25 seconds for either flame application, it is rated "free-burning" (FB), and it is considered as failing by this test.

B. Oxygen Index Flammability Rating

The above prepared cylindrical extrudates were also subjected to the Oxygen Index Flammability Test Method, described in ASTM 2863-74. The higher the oxygen index number, the better the flame retardancy.

Formulations containing the product of Example 1 were tested by the above-described methods. It was found that whereas the product of Example 1 alone did not show any activity at concentrations up to 30%, and melamine pyrophosphate (MPP) alone, at 30%, gave a V-2 rating and an oxygen index of 23.2, a mixture of 10% of the product of Example 1 and 10% MPP gave a V-0 rating and an oxygen index of 26.5. The results obtained are shown in Table I.

TABLE I

| Flame Retardant and Amount | UL-94 Rating | Oxygen Index |
|---|---|---|
| NONE | FB | 19.4 |
| Ex.1 - 20% | FB | 19.8 |
| Ex.1 - 30% | FB | 20.1 |
| MPP - 30% | V-2 | 23.2 |
| Ex.1 - 10% and MPP - 10% | V-0 | 26.5 |

EXAMPLE 3

The procedure of Example 2 was repeated except varying the amounts of polymeric phosphonate and melamine pyrophosphate. The same polymeric phosphonate was used. The results are in Table II below.

TABLE II

| Amount of Polymeric Phosphonate | Amount of MPP | UL-94 Rating | Oxygen Index |
|---|---|---|---|
| 25 | 5 | V-0 | 26.8 |
| 20 | 10 | V-0 | 30.9 |
| 15 | 15 | V-0 | 35.0 |
| 10 | 20 | V-0 | 27.4 |
| 5 | 25 | V-0 | 24.1 |

EXAMPLE 4

Polyphosphonates wherein the Y group was as shown were evaluated in poly(1,4-butylene terephthalate) using 15% of the polyphosphonate and 15% MPP. The compositions were prepared and tested according to the methods described in Example 2. The results obtained are shown in Table III.

TABLE III

| Y | Vertical Flammability Rating | Oxygen Index |
|---|---|---|
|  | V-0 | 35.3 |
| 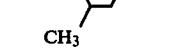 | V-0 | 31.5 |
| $\mathrm{-(CH_2)_6-}$ | V-0 | 30.4 |
| $\mathrm{-(CH_2)_4-}$ | V-0 | 29.6 |
| $\mathrm{-CH_2CH_2-}$ | V-0 | 28.3 |

What is claimed is:

1. A method of flame retarding a poly(1,4-butylene terephthalate) polymer comprising incorporating therewith an effective flame retardant amount of a combination of melamine pyrophosphate and a polymeric pentaerythrityl phosphonate of formula (I)

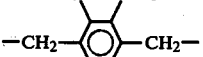

wherein Y is selected from

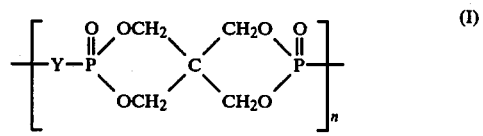

wherein n is at least 2; x is an integer from 1 to 8; y is an integer from 0 to 4; and the weight ratio of melamine pyrophosphate to polymeric phosphonate is from about 1:5 to about 5:1.

2. The method of claim 1 wherein Y is selected from the group consisting of

-continued

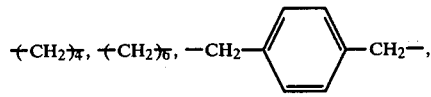 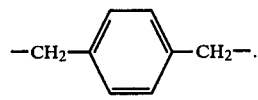

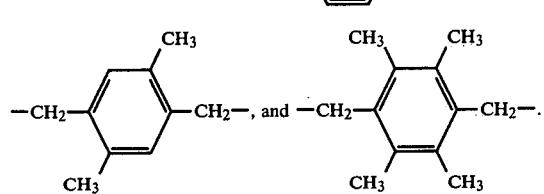

3. The method of claim 1 wherein Y is

4. The method of claim 1 further comprising incorporating therewith about 0.25 to 5 percent by weight, based on the weight of the polymer, of a material selected from the group consisting of (1) an alkaline earth metal carbonate, (2) an alkaline earth metal oxide, (3) a Group IV-A metal oxide, (4) titanium dioxide, (5) zinc oxide, and (6) antimony oxide.

5. The compositions produced by the method of claims 1, 2, 3 or 4.

* * * * *